United States Patent [19]

Herkes

[11] 3,876,711
[45] Apr. 8, 1975

[54] SELECTIVE REDUCTION OF CHLOROFLUOROBENZENES

[75] Inventor: Frank E. Herkes, Wilmington, Del.

[73] Assignee: E. I. du Pont de Nemours and Company, Wilmington, Del.

[22] Filed: Mar. 29, 1973

[21] Appl. No.: 346,159

[52] U.S. Cl. ............................................ 260/650 F
[51] Int. Cl. .......................................... C07c 25/00
[58] Field of Search ................................ 260/650 F

[56] References Cited
OTHER PUBLICATIONS

Wall et al., J. of Research of the Nat'l Bureau of Standards 67A, No. 5, (1963) pages 481, 484, 485 and 496.

*Primary Examiner*—Daniel D. Horwitz
*Attorney, Agent, or Firm*—D. R. J. Boyd

[57] ABSTRACT

Halogen in chlorofluorobenzenes can be selectively replaced by hydrogen by reduction with aluminum hydride compounds. Lithium aluminum hydride, lithium diethoxy aluminum hydride and sodium bis(2-methoxyethoxy)aluminum hydride selectively replace fluorine with hydrogen. Sodium diethyl aluminum hydride in hydrocarbon solvents at −20° to 30° C selectively replaces chlorine. At higher temperatures and in ether solvents fluorine is selectively replaced. The reduction products, especially the monohydro products, are useful as working fluids in Rankine-cycle engines.

4 Claims, No Drawings

SELECTIVE REDUCTION OF CHLOROFLUOROBENZENES

FIELD OF THE INVENTION

This invention relates to selective reduction of chlorofluorobenzenes.

THE PRIOR ART

Fieser and Fieser, "REactants for Organic Reactants, John Wiley & Sons, Inc., New York, N.Y., 1972, p. 176, Vol. 3 report that aryl halides have been generally considered inert to lithium hydride reduction. Recent work of Brown et al. ~J. Org. Chem. 34, 3918 (1969)] is referred to as showing reduction in tetrahydrofuran and good yields from aryl bromides and iodides. Aryl chlorides are reduced so slowly that bromine and iodine can be selectively reduced. Brown referes to earlier work by Karabatsos and Shone [J. Org. Chem. 33, 619 (1968)] who report that unactivated aryl bromides and chlorides reduce very slowly while aryl iodides are reduced quickly at 100° C in diglyme. Brown attributes his superior results to the use of tetrahydrofuran solutions of lithium aluminum hydride, whereas Karabatsos used slurries of lithium aluminum hydride in various solvents.

L. A. Wall et al., J. Res. Natl. Bur. Std. 67A, 481 (1963) disclose the reduction of hexafluorobenzene to pentafluorobenzene by lithium aluminum hydride in ether.

D. J. Halsop et al., J. Chem. Soc. 1801 (1962) report the reduction of octafluorotoluene with lithium aluminum hydride in ether to yield 4H-heptafluorotoluene.

Netherlands Applications 65/17221 and 65/17222 (Great Britain Priority 1/4/65) describe the reduction of aryl chlorides using zinc and acetic acid. Thus, 1,3,5-trifluoro-2,4,6-trichlorobenzene gave 8% yield of 1,3,-5-trifluoro-2,4-dichlorobenzene along with 91% recovery of unchanged starting material.

DESCRIPTION OF THE INVENTION

The present invention is a process of selectively replacing halogen by hydrogen in chlorofluorobenzenes of the formula

$$C_6H_pCl_qF_r$$

wherein $p$ is 0 to 2, $q$ is 1 to 5, $r$ is 1 to 5 and $p + q + r = 6$, which comprises contacting and reacting the chlorofluorobenzene with a solution of aluminum hydride compound selected from lithium aluminum hydride, sodium diethyl aluminum hydride, lithium diethoxy aluminum hydride and sodium bis(2-methoxyethoxy)-aluminum hydride in a solvent selected from hydrocarbon solvents, ether solvents and mixtures thereof, at a temperature between −50° and 125° C, preferably −30° to 100° C.

All of the aforesaid aluminum hydride compounds can be employed to selectively replace fluorine by hydrogen in chlorofluorobenzenes. The preferred solvents for this purpose are ether solvents such as diethyl ether, tetrahydrofuran, dioxane, lower alkyl ether of ethylene glycol and polyethylene glycols and the like. Hydrocarbon solvents can also be employed and particularly aromatic solvents such as benzene, toluene and xylene. The proportion of chlorine replaced tends to increase when hydrocarbon solvents are used, and indeed in the case of sodium diethylaluminum hydride in hydrocarbon solvents between about −20° to 30° C, chlorine is replaced in preference to fluorine, the optimum temperature being about 0° to 10° C. At temperatures higher than 30° C, sodium diethylaluminum hydride preferentially replaces fluorine with hydrogen.

The aluminum hydride compound is preferably used in about 140% to 180% of the stoichiometric amount to obtain optimum conversion in a reasonable time without excessive reduction. The time required for reduction varies with the reducing agent selected, the temperature and the solvent and is generally about 0.5 to 24 hours.

Following the reduction, the reaction can be stopped by the addition of hydroxylic compounds which react rapidly with the excess hydride. The halogenated aromatic products can then be separated by conventional means.

The products are, for the most part, known compounds and are particularly useful as thermally stable and chemically inert heat transfer fluids and as the working fluids for external combustion engines operating on the Rankine-cycle.

SPECIFIC EMBODIMENTS OF THE INVENTION

This invention is illustrated by the following specific embodiments which are not however, intended to fully illustrate the scope of the discovery.

It will be noted that the rules for many compounds may result in the naming of products obtained by replacement of an halogen atom in a polyhalobenzene by hydrogen where the numbering of the recurring halogen atoms differs from their numbering in the starting material. This, however, should not be construed as implying that a molecular rearrangement has taken place.

EXAMPLE 1

Reduction of 1,3,5-Trichloro-2,4,6-trifluorobenzene with Sodium bis(2-methoxyethoxy)aluminum Hydride A solution of 5.0 g (0.021) of 1,3,5-trichloro-2,4,6-trifluorobenzene(I) in 25 ml of ether was treated at −10° C under a nitrogen atmosphere with 3.9 ml of "Vitride" [70% solution of sodium bis(2-methoxyethoxy)aluminum hydride in benzene, Eastman Org. Chem., 0.014 mole, 80% excess hydride] diluted in 10 ml of benzene. After 0.5 hour the reaction mixture was quenched with 20 ml of 20% (v/v) $H_2SO_4$ at 0° C. The layers were separated and the aqueous layer extracted with ether (2 × 50 ml). The combined extracts were washed with saturated NaCl solution and dried over anhydrous $MgSO_4$. Removal of drying agent and solvents gave 4 g of liquid which when analyzed by $^{19}F$ nmr spectroscopy (neat) showed the following ratio of materials: unreacted 1,3,5-trichloro-2,4,6-trifluorobenzene (11%), 1,3,5-trichloro-2,4-difluorobenzene (78%), 1,3-dichloro-2,4,6-trifluorobenzene (11%), and less than 1% of 1,3-dichloro-4,6-difluorobenzene. Their physical properties and $^{19}F$ nmr data are given in Table II.

The effects of temperature, excess hydride, reaction time, and solvent, employing similar reaction conditions, are summarized by Examples 2 through 8 in Table I.

TABLE I

Reduction of Chlorofluorobenzenes With "Vitride"[TM]

| Ex. | Reductant[1] "Vitride"[TM] (% Excess) | Solvent | $C_6H_a$-$Cl_bF_c$ | Temp. °C | (3) Time h:min | Conversion % | Products[2] | | | |
|---|---|---|---|---|---|---|---|---|---|---|
| | | | | | | | $C_6Cl_3F_2H$ | $C_6Cl_3F_2H$ | $C_6Cl_2F_3H$ | $C_6Cl_2F_2H_2$ |
| 1 | (80) | Ether/$C_6H_6$ 1.7/1 | 1,3,5-$Cl_3F_3C_6$ | −10 | 0:30 | 89.0 | 87.0 | 0.5 | 12.3 | 0.7 |
| 2 | (80) | Ether/$C_6H_6$ 1.7/1 | do. | −20 | 0:30 | 63.8 | 76.3 | 0.5 | 16.9 | 6.7 |
| 3 | (80) | Ether/$C_6H_6$ 1.7/1 | do. | 5 | 0:30 | 100 | 81.8 | 0.5 | 17.0 | 1.2 |
| 4 | (46) | Ether/$C_6H_6$ 1.4/1 | do. | 0 | 0:30 | 91.4 | 73.8 | 0.5 | 17.0 | 1.2 |
| 5 | (46) | Ether/$C_6H_6$ 2/1 | do. | −30 | 2:00 | 92.0 | 79.0 | 0.5 | 21.0 | 0.0 |
| 6 | (70) | Ether/$C_6H_6$ 2/1 | do. | 5 | 0:30 | 100[4] | 68.2 (71.2) | 6.8 (6.5) | 19.3 (17.1) | 5.9 (4.4) |
| 7 | (65) | THF | (5) | 5 | 0:30 | 100 | 81.2 | — | 18.8 | — |
| 8 | (57) | $C_6H_6$ | (6) | 5 | 1:00 | — | 84.2 | 2.4 | 8.3 | 4.6 |

[1] Sodium bis(2-methoxyethoxy)aluminum hydride.
[2] Percentages of converted material as determined by $^{19}$F nmr.
[3] Time after complete addition.
[4] Values in ( ) are by gas-liquid phase chromatography on 6′ × ¼″ column packed with 20% Triton X 305; 60/80 mesh Chrom W(NAW) at 160°C.
[5] Mixture of ca. 87% of 1,3,5-trichloro-trifluorobenzene and ca. 13% 1,2,3-trichloro-trifluorobenzene.
[6] 88/12 (%) mixture of (45% 1,3,5-trichloro-2,4,6-trifluorobenzene; 45% 1,2,3-trichloro-4,5,6-trifluorobenzene; 10% 1,2,4-trichloro-3,5,6-trifluorobenzene/trichlorodifluorobenzene.

EXAMPLE 9

Reduction of 1,3,5-Trichloro-2,4,6-trifluorobenzene with Sodium Diethylaluminum Hydride in Toluene at 5° C A solution of 4.5 g (0.0192 mole) of 1,3,5-trichlorotrifluorobenzene in 35 ml of toluene was treated dropwise at 5° C over a 40-minute period with 6.5 g of a OMH-1, sold by Ethyl Corporation (25% solution of sodium diethylaluminum hydride in toluene, 0.0143 mole, 70% excess hydride) solution diluted with 10 ml of toluene. After 0.5 hour the mixture was quenched with 20 ml of 20% (v/v) $H_2SO_4$. The layers were separated and the aqueous layer extracted with ether (2 × 25 ml). The organic extracts were washed with saturated NaCl and dried over $MgSO_4$. Removal of drying agent and solvents gave a liquid which was analyzed by Glpc on a 6 foot × ¼inch 20% Triton X305 column supported on 60/80 mesh Chrom W at 160° C with a flow rate of 40 cc/min. The conversion was ca. 8% to mainly 1,3-dichloro-2,4,6-trifluorobenzene (99%) and less than 1% 1,3,5-trichloro-2,4-difluorobenzene. The effects of temperature and reaction time employing the above reducing agent with trichlorotrifluorobenzene are summarized in Table II.

EXAMPLE 18

Reduction of Trichlorotrifluorobenzene (87% 1,3,5-trichloro-2,4,6-trifluorobenzene and 13% 1,2,3-trichloro-4,5,6-trifluorobenzene with Lithium Aluminum Hydride in THF A solution of 3 g (0.0128 mole) of trichlorotrifluorobenzene (87% 1,3,5-trichloro-2,4,6-trifluorobenzene and 13% 1,2,3-trichloro-4,5,6-trifluorobenzene in 25 ml of THF was treated dropwise at 5° C under a nitrogen atmosphere with 9.5 ml of a 0.45 M solution of (0.0042 mole, 96% excess hydride) lithium aluminum hydride in THF over a 15-minute period. After 0.5 hour the mixture was quenched with 15 ml of 20% (v/v) $H_2SO_4$. Water (50 ml) was added to the mixture followed by extraction with benzene (3 × 25 ml), washing with saturated NaCl, and drying over $MgSO_4$. Glpc analysis on 6 feet × ¼ inch 20% Triton X305 column supported on 60/80 Chrom W (NAW) at 160° C (flow rate 40 ml/min) showed 54% conversion to only difluorotrichlorobenzenes.

Additional studies on the effects of temperature, concentration and solvent are summarized in Table III.

TABLE II

Reduction of Chlorofluorobenzenes with Na(ET)$_2$AlH$_2$

| Ex. | Reductant Na(Et)$_2$AlH$_2$ (% Excess) | Solvent | $C_6H_aCl_bF_c$ | Temp. °C | Time[1] h:min | Conversion % | Products[2] | | | |
|---|---|---|---|---|---|---|---|---|---|---|
| | | | | | | | $C_6Cl_3F_2H$ | $C_6Cl_3FH_2$ | $C_6Cl_2F_3H$ | $C_6Cl_2F_2H_2$ |
| 9 | (70) | Toluene | 1,3,5-$C_6Cl_3F_3$ | 5 | 0:30 | 8 | <1 | — | 99.0 | — |
| 10 | (70) | Toluene | (3) | 25 | 1:00 | 26.9 | 21.7 | — | 78.3 | — |
| 11 | (70) | THF | (3) | 25 | 0:30 | 100.0 | 73.5[4] | 26.3 | — | — |
| 12 | (5) | THF | do. | 25 | 1:00 | 53.0 | 100 | 0.0 | — | — |
| 13 | (30) | Toluene | do. | 30 | 26:30 | 23.9 | 40.8 | — | 59.2 | — |
| 14 | (70) | Toluene | do. | 50 | 0:30 | 38.0 | 78.0 | — | 22.0 | — |
| 15 | (70) | Toluene | do. | −20 | 96:00 | 9.0 | 47.6 | — | 52.0 | — |
| 16 | (70) | Toluene | do. | 100 | 0:30 | 51.0[6] | 82.2 | — | 16.1 | — |
| 17 | (70) | Toluene | do. | 5 | 8:00 | 12.0 | 76.3 | — | 23.7 | — |

[1] Time after complete addition.
[2] Glpc analysis on 6′ × ¼″ 20% Triton X305 on 60/80 mesh Chrom W(NAW) at 160°C/40 cc/min.
[3] Mixture ca. 87% 1,3,5-trichlorotrifluorobenzene and 13% 1,2,3-trichlorotrifluorobenzene.
[4] Isomer distribution: 55.7% 1,3,5-trichloro-2,4,6-trifluorobenzene, 13.0% 1,2,4-trichloro-3,5,6-trifluorobenzene and 4.8% 1,2,4-trichloro-3,5-difluorobenzene.
[5] 30% excess trichlorotrifluorobenzene.
[6] 1.7% unknown.

TABLE III

Reduction of Chlorofluorobenzenes with LiAlH₄

| Ex. | Reductant LiAlH₄ (% Excess) | Solvent | $C_6H_aCl_bF_c$ | Temp. °C | Time[1] h:min | Conversion % | Products[2] $C_6Cl_3F_2H$ | $C_6Cl_3FH_2$ | $C_6Cl_2F_3H$ | $C_6Cl_2F_2H_2$ |
|---|---|---|---|---|---|---|---|---|---|---|
| 18 | (96) | THF | (3) | 5 | 0:30 | 54 | 100 | — | — | — |
| 19 | (96) | THF | do. | 25 | 0:30 | 72 | 100 | — | — | — |
| 20 | (250) | THF | do. | 5 | 0:30 | 93 | 100 | — | — | — |
| 21 | (250) | $C_6H_6$/THF[6] | do. | 5 | 0:30 | 78 | 100 | — | — | — |
| 22 | (300) | THF | do. | 25 | 2:00 | 100 | 55 | 45 | 0 | — |
| 23 | (250) | THF | (4) | 5 | 0:30 | 86 | 67.5 | — | — | 32.5 (5) |
| 24 | (96) | Ether | (3) | 25 | 0:30 | 22.8 | 94.8 | — | 5.2 | — |
| 25 | (250) | Ether | (4) | 5 | 0:30 | 20.8 | 68.5 | 2.1 | 29.4 | — |

[1] Time after complete addition.
[2] Percentages of converted material as analyzed on 6' × ¼" 20% Triton X305 on 60/80 mesh Chrom W (NAW) at 160°C/40 cc/min.
(3) Mixture ca. 87% 1,3,5-trichlorotrifluorobenzene and ca. 13% 1,2,3-trichlorofluorobenzene.
(4) Mixture 88%:12% trichlorotrifluorobenzene (45% 1,3,5- and 45% 1,2,3-trichlorotrifluorobenzenes) and 10% 1,2,4-trichlorodifluorobenzene.
(5) Product distribution: 42.1% 1,3,5-trichloro-2,4-difluorobenzene; 10.4% 1,2,4-trichloro-3,5-difluorobenzene; 32.5% 2,3-dichloro-4,5-difluorobenzene; 2.3% 1,2,5-trichloro-3,4-difluorobenzene; 7.5% 1,2,3-trichloro-4,6-difluorobenzene; 5.2% 1,2,4-trichloro-3,6-difluorobenzene.
(6) 1.25/1 $C_6H_6$/THF.

EXAMPLE 26

Reduction of Trichlorotrifluorobenzene (87% 1,3,5-trichloro-2,4,6-trifluorobenzene and 13% 1,2,3-trichloro-4,5,6-trifluorobenzene with Lithium Diethoxyaluminum Hydride in THF A solution of 3 g (0.0128 mole) of trichlorotrifluorobenzene (87% 1,3,5-trichloro-2,4,6-trifluorobenzene and 13% 1,2,3-trichloro-4,5,6-trifluorobenzene) in 25 ml of THF was treated dropwise with 19 ml of 0.45 M (0.0086 mole, 126% excess hydride) solution of lithium diethoxyaluminum hydride in THF, prepared from lithium aluminum hydride and ethanol (H. C. Brown and C. J. Shoaf, J. Am. Chem. Soc., 86, 1079 [1964]), at 5° C. After 0.5 hour the mixture was quenched with 15 ml of 20% $H_2SO_4$. Work-up in the usual way gave a 26% conversion to difluorotrichlorobenzene as the sole product.

The embodiments of the invention in which an exclusive property or privilege is claimed are defined as follows:

1. A method of selectively replacing fluorine with hydrogen in trichlorotrifluorobenzene which comprises contacting and reacting trichlorotrifluorobenzene at a temperature between −30° and 100° C with from 140% to 180% of the stoichiometric quantity of a solution of an aluminum hydride compound selected from lithium aluminum hydride, lithium diethoxy aluminum hydride and sodium bis(2-methoxyethoxy)aluminum hydride in a solvent selected from diethyl ether, tetrahydrofuran, dioxane, lower alkyl ethers of ethylene glycol, lower alkyl ethers of polyethylene glycol, benzene, toluene, xylene, or mixtures thereof.

2. A method of selectively replacing chlorine with hydrogen in trichlorotrifluorobenzene which comprises contacting and reacting trichlorotrifluorobenzene at a temperature of −20° to 30° C with from 140% to 180% of the stoichiometric quantity of a solution of diethylaluminum hydride in a solvent selected from benzene, toluene or xylene or mixtures thereof.

3. Method of claim 2 wherein said hydrocarbon solvent is toluene.

4. Method of claim 3 wherein the temperature is between about 0° and 10° C.

* * * * *